(12) United States Patent
Shiga et al.

(10) Patent No.: US 11,229,272 B2
(45) Date of Patent: Jan. 25, 2022

(54) NAIL PRODUCTION SYSTEM AND NAIL PRODUCTION METHOD

(71) Applicant: Sony Corporation, Tokyo (JP)

(72) Inventors: Fumiko Shiga, Tokyo (JP); Tomomasa Watanabe, Kanagawa (JP); Naoko Ishiduka, Kanagawa (JP); Soichi Fukasawa, Saitama (JP); Yue Ouyang, Tokyo (JP); Sachiko Takahashi, Tokyo (JP); Nobuyuki Uchiyama, Kanagawa (JP); Akira Tange, Tokyo (JP)

(73) Assignee: Sony Corporation, Tokyo (JP)

( * ) Notice: Subject to any disclaimer, the term of this patent is extended or adjusted under 35 U.S.C. 154(b) by 635 days.

(21) Appl. No.: 16/301,842

(22) PCT Filed: Jun. 5, 2017

(86) PCT No.: PCT/JP2017/020761
§ 371 (c)(1),
(2) Date: Nov. 15, 2018

(87) PCT Pub. No.: WO2018/016205
PCT Pub. Date: Jan. 25, 2018

(65) Prior Publication Data
US 2019/0150586 A1    May 23, 2019

(30) Foreign Application Priority Data
Jul. 20, 2016    (JP) .............. JP2016-142186

(51) Int. Cl.
*H04N 1/00*        (2006.01)
*A45D 31/00*       (2006.01)
(Continued)

(52) U.S. Cl.
CPC .............. *A45D 31/00* (2013.01); *B41M 1/40* (2013.01); *G06Q 30/0621* (2013.01);
(Continued)

(58) Field of Classification Search
CPC .. A45D 31/00; A45D 44/005; H04N 1/00676; H04N 1/00726; B41M 1/40; G06Q 50/04
See application file for complete search history.

(56) References Cited

U.S. PATENT DOCUMENTS 6,067,996 A * 5/2000 Weber ................... A45D 31/00
132/73
6,286,517 B1 * 9/2001 Weber ................... A45D 29/00
132/73
(Continued)

FOREIGN PATENT DOCUMENTS

JP       2005-074106 A       3/2005
JP       2005074106 A  *     3/2005
(Continued)

OTHER PUBLICATIONS

International Search Report and Written Opinion issued in connection with International Patent Application No. PCT/JP2017/020761, dated Jul. 11, 2017. (10 pages).

*Primary Examiner* — Ted W Barnes
(74) *Attorney, Agent, or Firm* — K&L Gates LLP

(57) ABSTRACT

A nail production system according to an embodiment of the disclosure includes a first correction section and a first conversion section. The first correction section corrects shape data of an existing nail tip or an existing nail sticker on the basis of measurement data of a nail, to thereby generate shape data of an original nail tip or an original nail sticker. The first conversion section converts the shape data of the original nail tip or the original nail sticker that is generated by the first correction section into print data.

6 Claims, 12 Drawing Sheets

(51) Int. Cl.
*G06Q 30/06* (2012.01)
*B41M 1/40* (2006.01)
*H04N 1/23* (2006.01)

(52) U.S. Cl.
CPC ..... *H04N 1/00676* (2013.01); *H04N 1/00726* (2013.01); *H04N 1/2384* (2013.01)

(56) References Cited

U.S. PATENT DOCUMENTS

| | | | | |
|---|---|---|---|---|
| 6,525,724 | B1* | 2/2003 | Takami | A45D 29/00 345/419 |
| 7,123,983 | B2* | 10/2006 | Yogo | A45D 31/00 700/182 |
| 9,090,092 | B2* | 7/2015 | Bitoh | A45D 29/00 |
| 2004/0143359 | A1* | 7/2004 | Yogo | A45D 31/00 700/161 |
| 2005/0150508 | A1* | 7/2005 | Downs | B44C 1/105 132/73 |
| 2008/0163344 | A1* | 7/2008 | Yang | G06T 19/00 726/4 |
| 2009/0092310 | A1* | 4/2009 | Gifford | A61K 8/00 382/141 |
| 2011/0087351 | A1* | 4/2011 | Sachdeva | G06F 30/00 700/98 |
| 2012/0103210 | A1* | 5/2012 | Hashimoto | B41J 3/407 101/35 |
| 2012/0113171 | A1* | 5/2012 | Murata | B41J 3/407 347/2 |
| 2012/0287192 | A1* | 11/2012 | Yamasaki | B41J 3/407 347/14 |
| 2013/0174862 | A1* | 7/2013 | Samain | B33Y 80/00 132/200 |
| 2014/0081463 | A1* | 3/2014 | Igarashi | B01F 13/1063 700/265 |
| 2014/0168668 | A1* | 6/2014 | Nakajima | B41J 3/4073 358/1.6 |
| 2015/0173483 | A1* | 6/2015 | Raouf | A45D 29/001 132/200 |
| 2015/0235402 | A1* | 8/2015 | Anderson | G06F 3/04845 345/641 |
| 2016/0302550 | A1* | 10/2016 | Cody Teichner | A44C 17/02 |
| 2016/0309877 | A1* | 10/2016 | Papshev | A45D 29/00 |
| 2017/0036456 | A1* | 2/2017 | Legallais | B41J 3/407 |
| 2017/0232669 | A1* | 8/2017 | Watanabe | G02F 1/31 264/496 |
| 2018/0133954 | A1* | 5/2018 | Watanabe | A61Q 3/02 |
| 2018/0263356 | A1* | 9/2018 | Cao | A45D 29/00 |
| 2018/0276230 | A1* | 9/2018 | Ouyang | G06F 30/00 |

FOREIGN PATENT DOCUMENTS

| | | | | |
|---|---|---|---|---|
| JP | 2006519030 A | | 8/2006 | |
| JP | 2011-067385 A | | 4/2011 | |
| JP | 2011067385 A | * | 4/2011 | |
| JP | 2012-232042 A | | 11/2012 | |
| JP | 2012232042 A | * | 11/2012 | |
| JP | 2014-006731 A | | 1/2014 | |
| JP | 2014006731 A | * | 1/2014 | |
| JP | 2016-083206 A | | 5/2016 | |
| JP | 2016083206 A | * | 5/2016 | ............ A45D 29/00 |
| TW | 201524413 A | | 7/2015 | |
| TW | 201541362 A | | 11/2015 | |
| WO | 2016/067704 A1 | | 5/2016 | |
| WO | WO-2016067704 A1 | * | 5/2016 | ............ G06F 3/12 |

* cited by examiner

[FIG. 1]
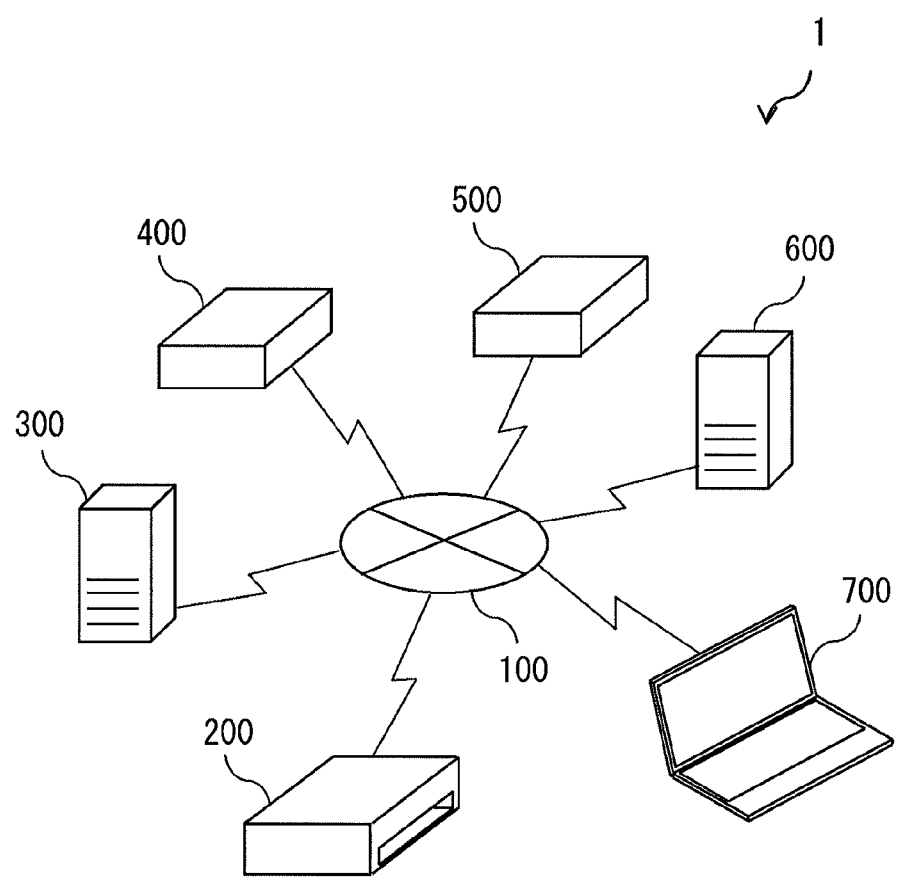

[ FIG. 2 ]
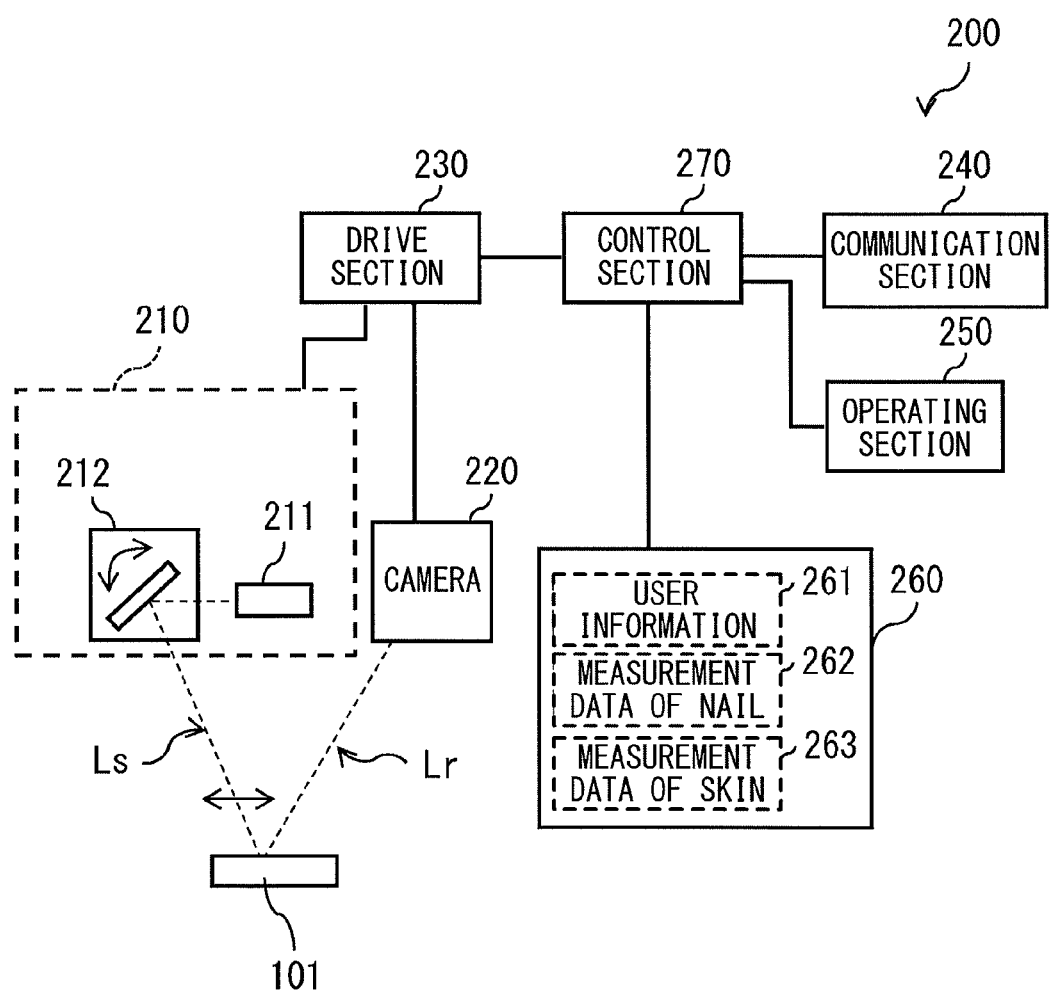

[ FIG. 3 ]
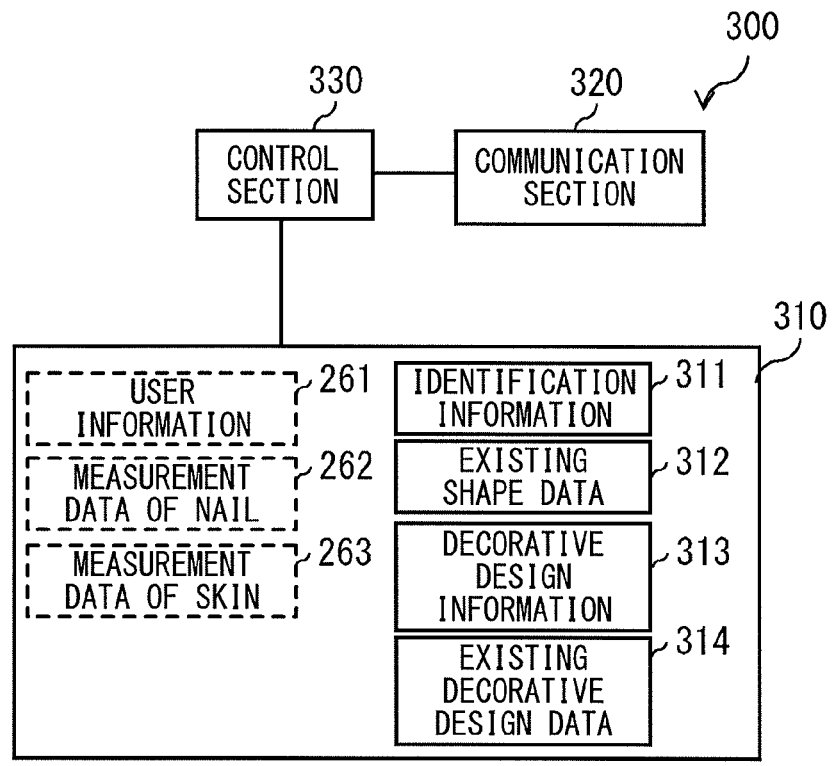
[ FIG. 4 ]
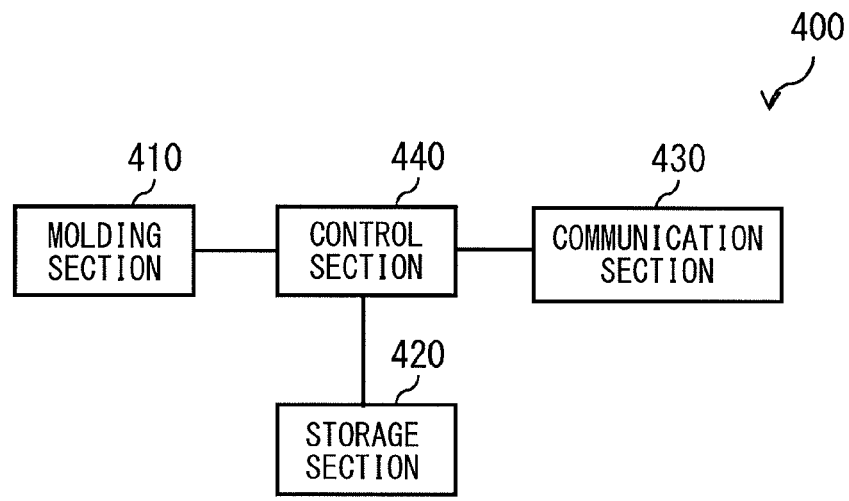

[ FIG. 5 ]
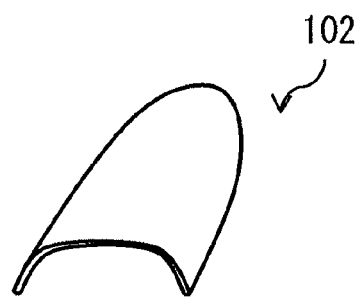
[ FIG. 6 ]
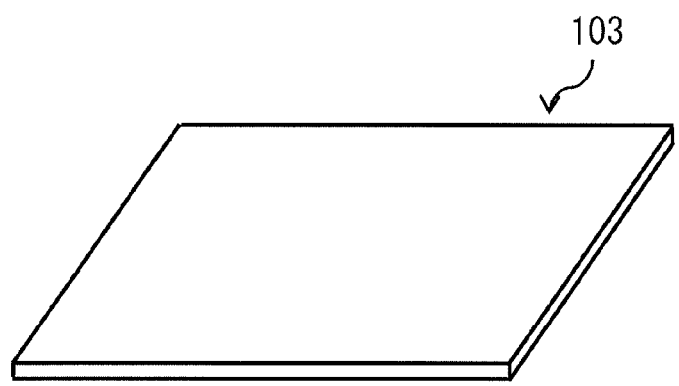

[ FIG. 7 ]
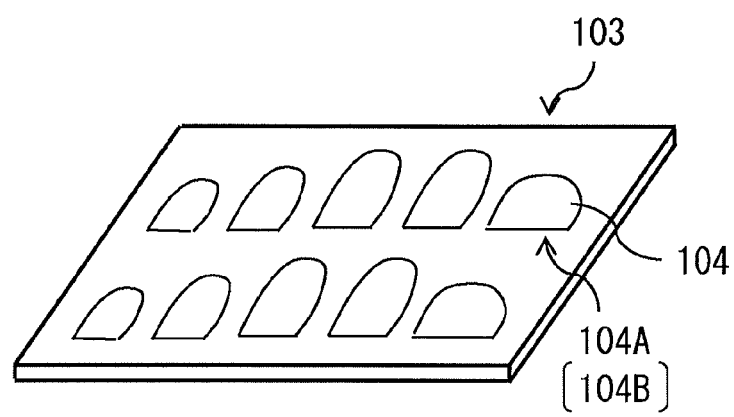
[ FIG. 8 ]
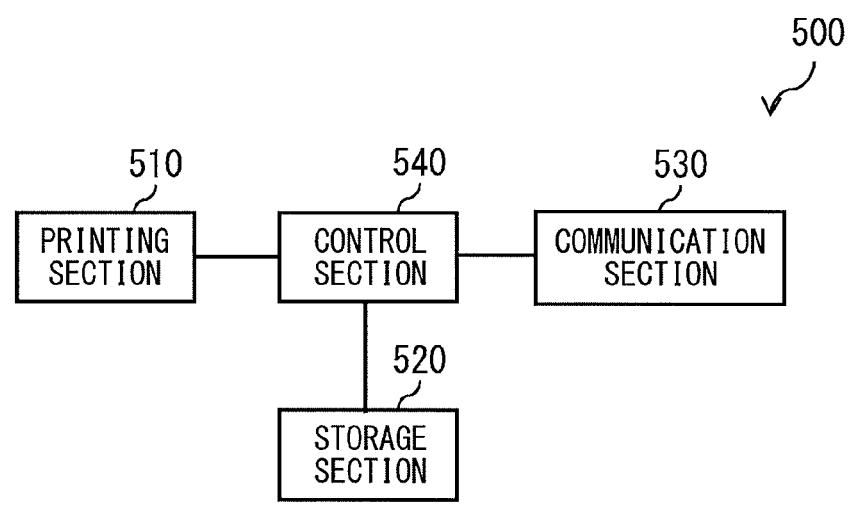

[ FIG. 9 ]
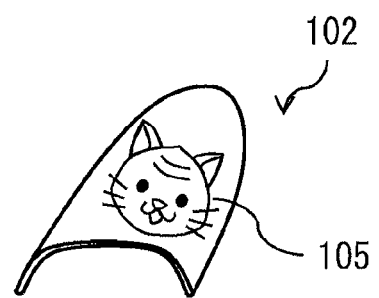
[ FIG. 10 ]
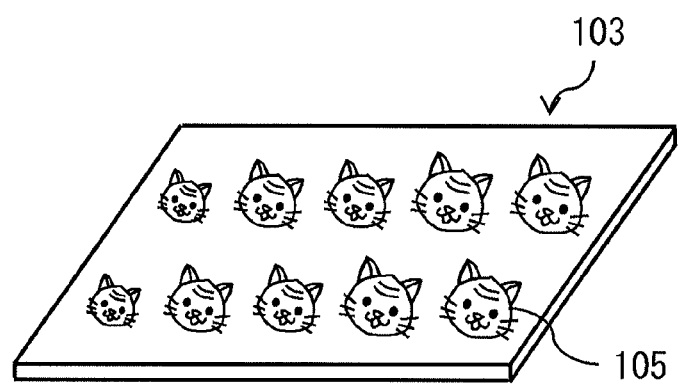

[ FIG. 11 ]
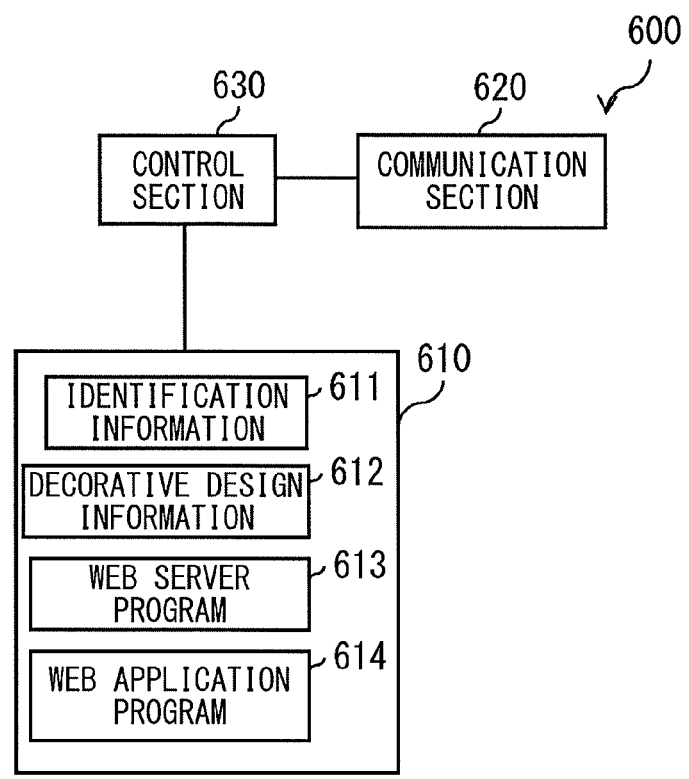
[ FIG. 12 ]
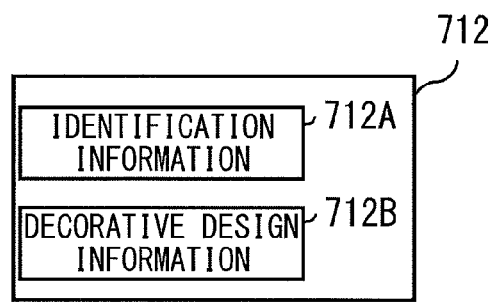

[ FIG. 13 ]
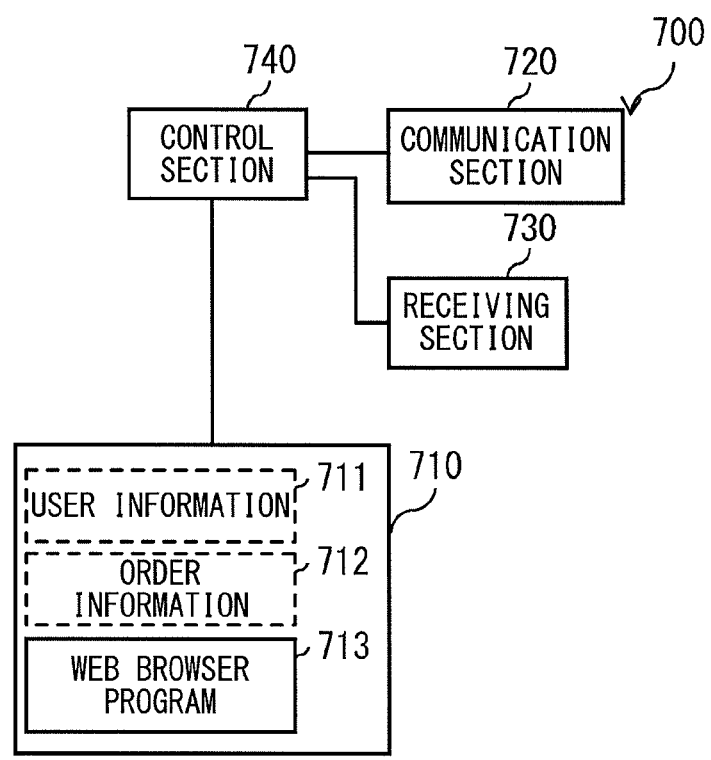

[ FIG. 14 ]
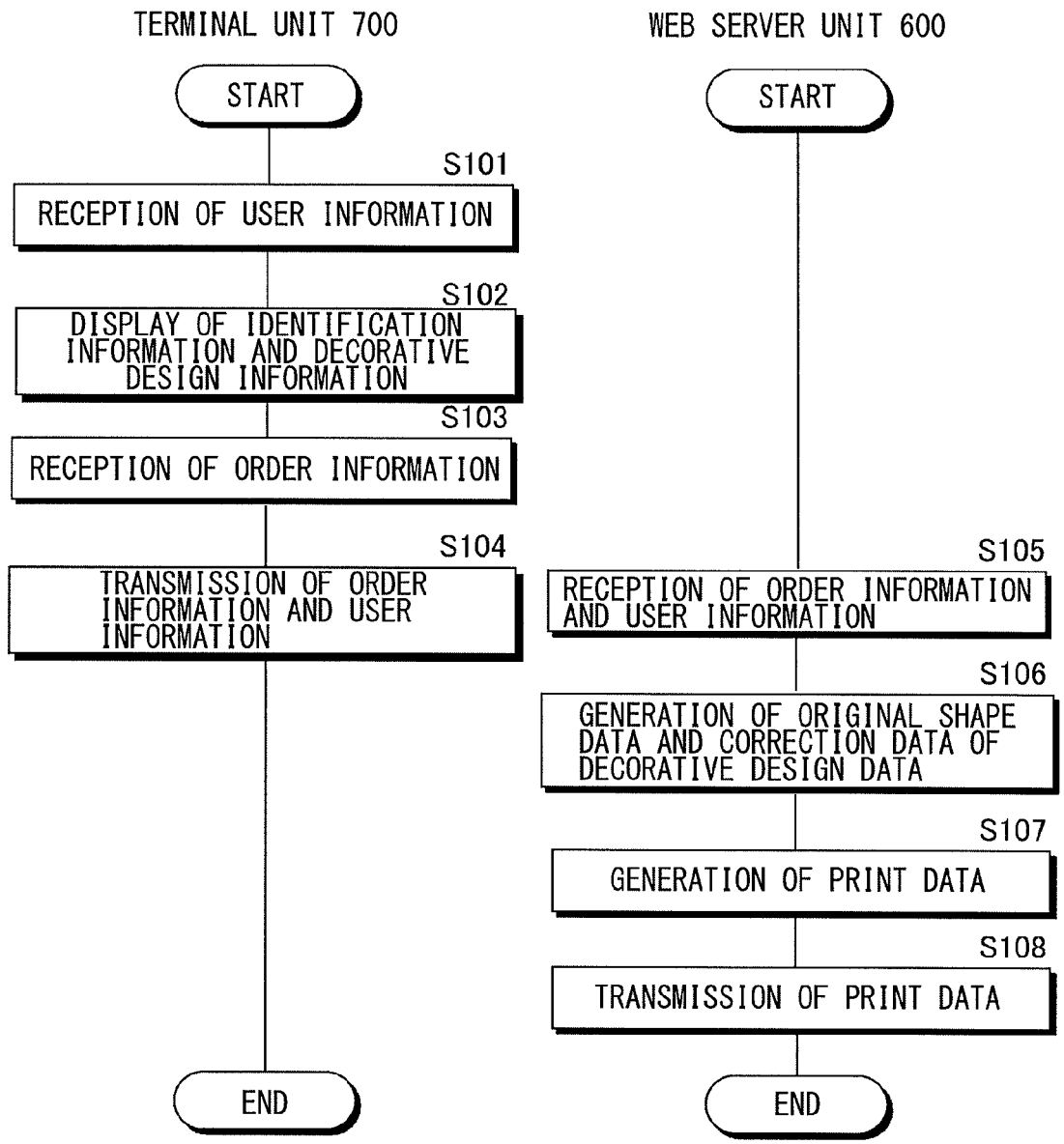

[ FIG. 15 ]
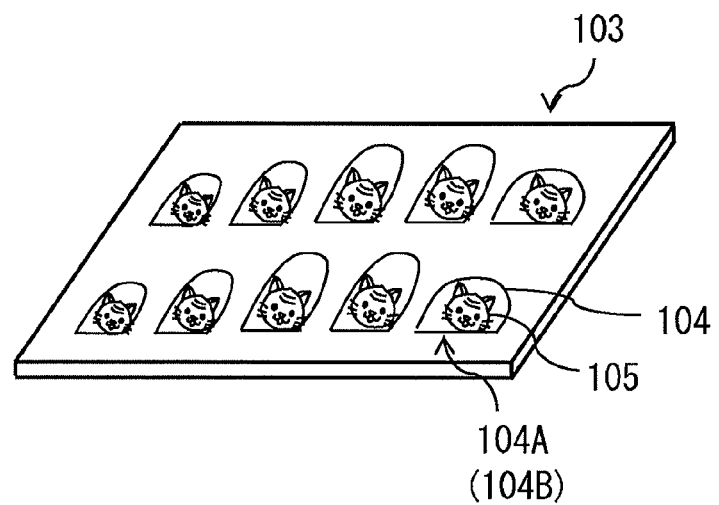

[ FIG. 16 ]
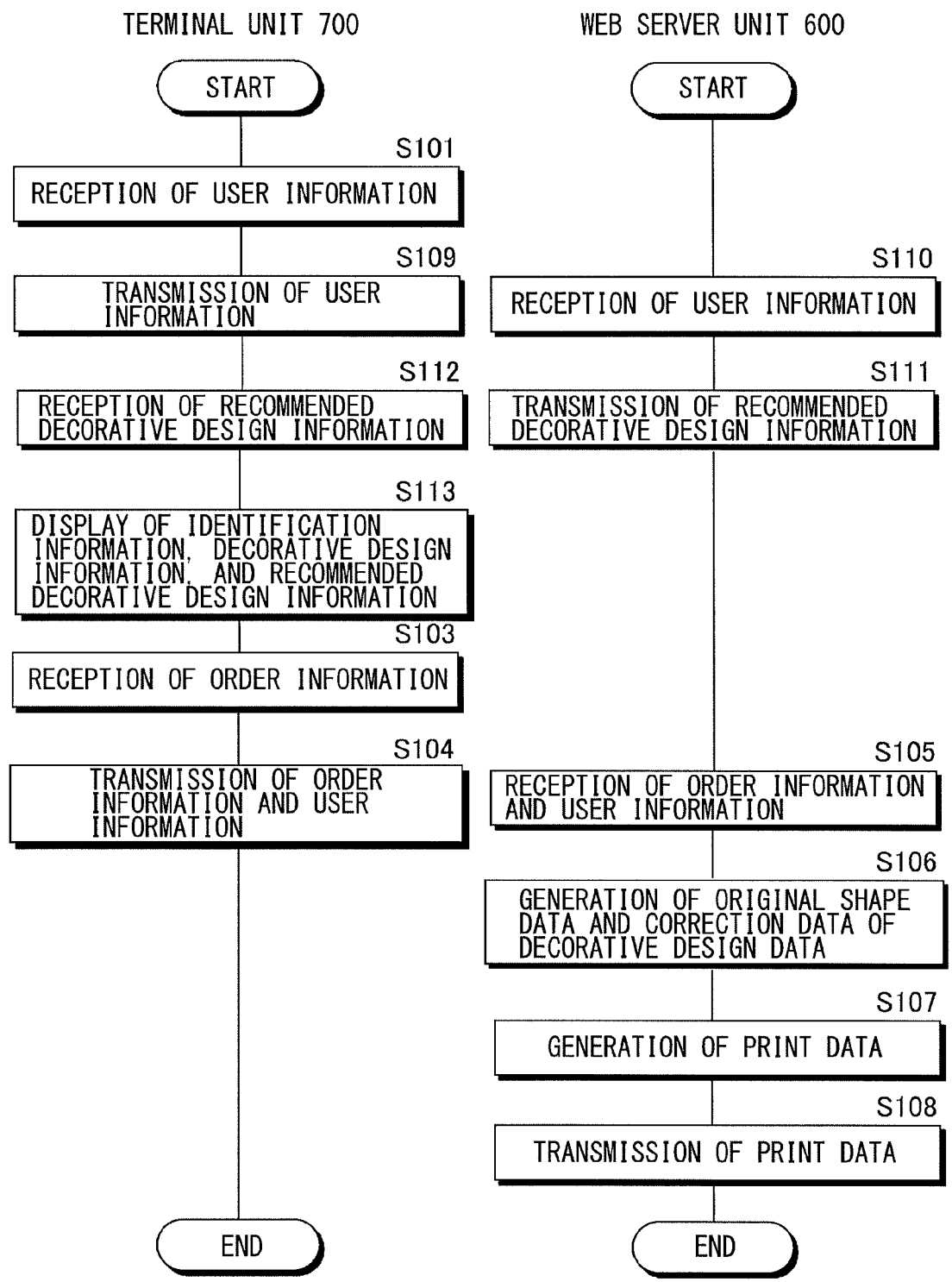

[ FIG. 17A ]
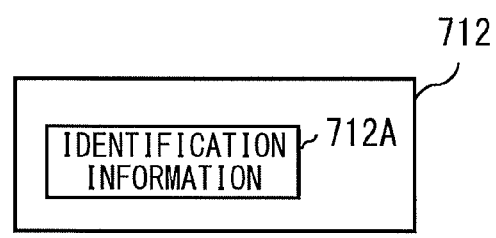
[ FIG. 17B ]
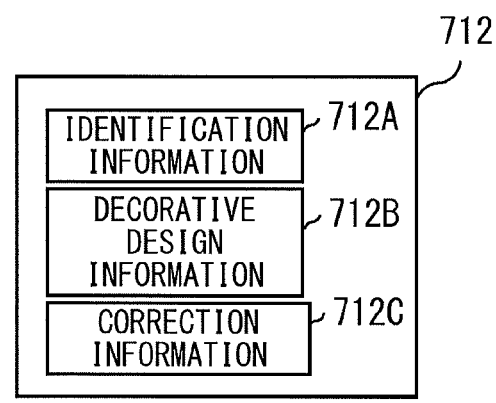

NAIL PRODUCTION SYSTEM AND NAIL PRODUCTION METHOD

CROSS-REFERENCE TO RELATED APPLICATIONS

The present application claims the benefit of International Application No. PCT/JP2017/020761, filed Jun. 5, 2017, which claims priority to Japanese Application No. 2016-142186, filed Jul. 20, 2016, the disclosures of which are incorporated herein by reference.

BACKGROUND

The present technology relates to a nail production system and a nail production method.

In recent years, the number of people has been increasing who attach nail tips or nail stickers with designs arranged thereon on their own nails to enjoy dressing up. Typically, a user selects the nail tips or the nail stickers with shapes or sizes meeting user's own nails or preference from among ready-made products. However, the shapes and sizes of the user's own nails are different for every user, and therefore ready-made nail tips or nail stickers do not fit the user's own nails, which has caused an issue of awful looking or easy peel-off. In contrast, PTL 1 proposes to produce the nail tips using a mold manufactured on the basis of CAD data on the user's own nails that is obtained by measurement.

SUMMARY

However, in a method described in a PTL 1, it is necessary to manufacture a mold for each user, resulting in an increase in manufacturing costs. It is therefore desirable to provide a nail production system and a nail production method that allow for producing a nail tip or a nail sticker that is easy to fit user's own nails at low cost.

A nail production system according to an embodiment of the disclosure includes a first correction section and a first conversion section. The first correction section corrects shape data of an existing nail tip or an existing nail sticker on the basis of measurement data of a nail, to thereby generate shape data of an original nail tip or an original nail sticker. The first conversion section converts the shape data of the original nail tip or the original nail sticker that is generated by the first correction section into print data.

A nail production method according to an embodiment of the present technology includes two steps given below:

(A) correcting shape data of an existing nail tip or an existing nail sticker on the basis of measurement data of a nail, to thereby generate shape data of an original nail tip or an original nail sticker; and (B) converting the shape data of the original nail tip or the original nail sticker that is generated by the first correction section into print data.

In the nail production system and the nail production method according to the respective embodiments of the present technology, the shape data of the original nail tip or the original nail sticker is generated from the shape data of the existing nail tip or the existing nail sticker on the basis of the measurement data of the nail. Further, the generated shape data is converted into the print data. This makes it possible to obtain the original nail tip or the original nail sticker that fits a shape or size of user's own nail with use of a printer without using a mold.

According to the nail production system and the nail production method of the respective embodiments of the present technology, it is possible to obtain the original nail tip or the original nail sticker that fits a shape or size of user's own nail with use of a printer without using a mold. Therefore, this allows for producing a nail tip or a nail sticker that is easy to fit user's own nail at low cost. It is to be noted that the effects of the present technology are not necessarily limited to the effects described above, and may be any of the effects that will be described herein.

BRIEF DESCRIPTION OF DRAWINGS

FIG. 1 illustrates a schematic configuration example of a nail production system according to an embodiment of the present technology.

FIG. 2 illustrates a schematic configuration example of a registration unit illustrated in FIG. 1.

FIG. 3 illustrates a schematic configuration example of a data server unit illustrated in FIG. 1.

FIG. 4 illustrates a schematic configuration example of a molding unit illustrated in FIG. 1.

FIG. 5 illustrates an example of a nail tip.

FIG. 6 illustrates an example of a resin sticker.

FIG. 7 illustrates an example of a nail sticker.

FIG. 8 illustrates a schematic configuration example of a printing unit illustrated in FIG. 1.

FIG. 9 illustrates an example of a decorative design arranged on a nail tip.

FIG. 10 illustrates an example of a decorative design arranged on a resin sticker.

FIG. 11 illustrates a schematic configuration example of a web server unit illustrated in FIG. 1.

FIG. 12 illustrates an example of order information.

FIG. 13 illustrates a schematic configuration example of a terminal unit illustrated in FIG. 1.

FIG. 14 illustrates an example of procedures of generating print data in the nail production system illustrated in FIG. 1.

FIG. 15 illustrates an example of procedures of generating print data in the nail production system illustrated in FIG. 1.

FIG. 16 illustrates an example of a nail sticker.

FIG. 17A illustrates an example of the order information illustrated in FIG. 12.

FIG. 17B illustrates an example of the order information illustrated in FIG. 12.

DETAILED DESCRIPTION

Hereinafter, embodiments of the present technology are described in detail with reference to the drawings. It is to be noted that the description is given in the following order.
1. Embodiment (Nail Production System)
2. Modification Examples (Nail Production System)
   An example where a recommended decorative design is presented to a user
   An example where no decorative design is arranged on a nail tip or a nail sticker
   An example where a user also performs correction of a decorative design

1. Embodiment

[Configuration]

Descriptions are provided on a nail production system 1 according to an embodiment of the present technology. FIG. 1 illustrates a schematic configuration example of the nail production system 1. The nail production system 1 is a system that receives an order for a nail tip or a nail sticker over a network, and produces the nail tip or the nail sticker in a custom-made manner in accordance with contents of the received order.

The nail production system 1 includes a registration unit 200, a data server unit 300, a molding unit 400, a printing unit 500, a web server unit 600, and a terminal unit 700. The registration unit 200, the data server unit 300, the molding unit 400, the printing unit 500, the web server unit 600, and the terminal unit 700 are coupled with one another over a network 100. The network 100 is a network that carries out communication using, for example, a communication protocol (TCP/IP) available typically on the Internet. The network 100 may be, for example, a secure network that carries out communication with use of a communication protocol specific to the network. The network 100 is, for example, an internet, an intranet, or a local area network. Coupling between the network 100 and any of the registration unit 200, the data server unit 300, the molding unit 400, the printing unit 500, the web server unit 600, or the terminal unit 700 may be made, for example, over a wired LAN (Local Area Network), or over a wireless LAN such as Wi-Fi, or a mobile telephone line, etc.

(Registration Unit 200)

FIG. 2 illustrates a schematic configuration example of the registration unit 200. The registration unit 200 measures nails or a skin of a user, and registers resulting measurement data of the nails or the skin onto the data server unit 300. The registration unit 200 measures shapes of user's nails using a predetermined distance measuring method. Examples of the predetermined distance measuring method include an optical cutting method, a TOF (Time Of Flight) method, a monocular camera measuring method, or a compound-eye camera measuring method.

The optical cutting method is a method that irradiates an object with light in a slit-shaped, dot-shaped, or lattice-shaped pattern to acquire coordinate data of a surface of the object by triangulation. The TOF method is a method that acquires coordinate data of a surface of an object on the basis of a time period from when an object is irradiated with light until when light reflected from the object enters a light receiving device. The monocular camera measuring method is a distance measuring method with use of a natural law of perspective. The compound-eye camera measuring method is a camera-based triangulation method. The optical cutting method and the TOF method achieve higher accuracy than the monocular camera measuring method and the compound-eye camera measuring method. Further, in the optical cutting method, a color texture is achievable in a case where a white light source is used as a light source, which allows a skin color to be discriminated from the obtained color texture. Additionally, in a case where a white LED is used as the white light source, a speckle noise is made smaller than that generated in a case where a white laser is used, which makes it possible to obtain the coordinate data of the surface of the object with a high degree of accuracy.

Therefore, hereinafter, it is supposed that the registration unit 200 acquires the coordinate data of the surface of the object in the optical cutting method using the white LED as the light source. Thus, the registration unit 200 makes it possible to measure shapes of user's nails as well as a color of a user's skin with use of the optical cutting method.

The registration unit 200 has, for example, an optical scanning section 210, a camera 220, a drive section 230, a communication section 240, an operating section 250, a storage section 260, and a control section 270.

For example, the optical scanning section 210 emits slit light Ls toward a surface of a nail 101 (a finger tip including the nail 101) that is an object, and scans the slit light Ls on the surface of the nail 101 (the finger tip including the nail 101). The optical scanning section 210 has, for example, a light source section 211 that emits the slit light Ls, and a movable mirror 212 that causes the slit light Ls from the light source section 211 to be scanned on the surface of the nail 101 (the finger tip including the nail 101). The camera 220 detects reflected light Lr from the surface of the nail 101 (the finger tip including the nail 101) that is the object.

The drive section 230 drives the optical scanning section 210 and the camera 220 under control performed by the control section 270. The control section 270 controls driving of the optical scanning section 210 and the camera 220 through the drive section 230, and acquires coordinate data (measurement data 262 of the nail 101) of a surface of the nail 101 (the finger tip including the nail 101) by the triangulation using a detection result from the camera 220. At this time, the control section 270 acquires the coordinate data (the measurement data 262 of the nail 101) by causing slit-shaped white LED light extending in a finger width direction to be scanned in an extending direction of the finger. Further, the control section 270 acquires a color of a skin (measurement data 263 of the skin) with use of the detection result (color image) from the camera 220. It is to be noted that acquisition of the measurement data 263 of the skin may be omitted on an as-needed basis.

The control section 270 causes the measurement data 262 of the nail 101 and the measurement data 263 of the skin to be stored in the storage section 260 as well as in a storage section 310 inside the data server 300. Further, the control section 270 causes user information 261 inputted through the operating section 250 to be stored in the storage section 260 as well as in the storage section 310 inside the data server 300. The storage section 260 stores the measurement data 262 of the nail 101, the measurement data 263 of the skin, and the user information 261. The user information 261 is information serving to identify a user, and includes a user ID, for example. The operating section 250 accepts an input from a user. The operating section 250 includes, for example, a keyboard, a mouse, or a touch panel. The communication section 240 carries out communication with the other units (the data server unit 300, etc.) in the nail production system 1 over the network 100.

(Data Server Unit 300)

FIG. 3 illustrates a schematic configuration example of the data server unit 300. The data server unit 300 stores shape data of existing nail tips (three-dimensional data) or shape data of existing nail stickers (two-dimensional data). Further, the data server unit 300 stores information acquired from the registration unit 200 (the user information 261, the measurement data 262 of the nail, and the measurement data 263 of the skin).

The data server unit 300 has, for example, the storage section 310, a communication section 320, and a control section 330.

The storage section 260 stores data inputted from the registration unit 200 (the user information 261, the measurement data 262 of the nail 101, and the measurement data 263 of the skin). It is to be noted that the measurement data 263 of the skin may be omitted on an as-needed basis. Further, the storage section 310 stores existing shape data 312. The existing shape data 312 includes, for example, shape data of one or a plurality of existing nail tips (three-dimensional data), or shape data of one or a plurality of existing nail stickers (two-dimensional data). Additionally, the storage section 310 stores identification information 311. The identification information 311 is an identifier that is assigned for each shape data included in the existing shape data 312. The above-described identifier is at least one of a name and a thumbnail of a nail tip or a nail sticker, for example.

The storage section 310 stores, for example, existing decorative design data 314. The existing decorative design data 314 includes, for example, image data of one or a plurality of decorative designs to be printed on a surface of a nail tip or a nail sticker. Further, the storage section 310 stores, for example, decorative design information 313. The decorative design information 313 is information concerning the decorative design that is assigned for each image data of the decorative design that is included in the decorative design data 314. The above-described "information concerning the decorative design" is at least one of a name or a thumbnail of the decorative design, for example. It is to be noted that the decorative design information 313 and the decorative design data 314 may be omitted on an as-needed basis.

(Molding Unit 400)

FIG. 4 illustrates a schematic configuration example of the molding unit 400. The molding unit 400 produces a molded object on the basis of data (print data 317) that is inputted over the network 100. The molding unit 400 has, for example, a molding section 410, a storage section 420, a communication section 430, and a control section 440.

For example, the molding section 410 produces an original nail tip (for example, a nail tip 102 as illustrated in FIG. 5) by discharging resin on the basis of the print data 317 (to be described later). Further, the molding section 410 produces an original nail sticker (a nail sticker 104), for example, as illustrated in FIG. 7 by cutting or half-cutting a resin sticker 103, for example, as illustrated in FIG. 6 on the basis of, for example, the print data 317. At this time, each of the nail stickers 104 is held in a cut or half-cut state with respect to the resin sticker 103. It is to be noted that FIG. 7 illustrates how an end edge of each of the nail stickers 104 includes a cutting line 104A or a half-cutting line 104B.

(Printing Unit 500)

FIG. 8 illustrates a schematic configuration example of the printing unit 500. The printing unit 500 performs printing on the basis of data (print data 319 (to be described later)) that is inputted over the network 100. The printing unit 500 has, for example, a printing section 510, a storage section 520, a communication section 530, and a control section 540.

The printing section 510 prints a decorative design 105 on a surface of the original nail tip (the nail tip 102), for example, as illustrated in FIG. 9 by discharging resin or ink on the basis of the print data 319, for example. Further, the printing section 510 prints the decorative design 105 on a surface of the resin sticker 103, for example, as illustrated in FIG. 10 on the basis of the print data 319, for example. It is to be noted that the original nail sticker (the nail sticker 104) with the decorative design 105 printed on a surface thereof is producible by cutting or half-cutting the resin sticker 103 on which the decorative design 105 is printed on the basis of the print data 317.

(Web Server Unit 600)

FIG. 11 illustrates a schematic configuration example of the web server unit 600. The web server unit 600 provides a user interface in the terminal unit 700. The web server unit 600 has, for example, a storage section 610, a communication section 620, and a control section 630.

The communication section 620 carries out communication with the other units (the data server unit 300, etc.) in the nail production system 1 over the network 100. The storage section 610 stores programs, etc. (for example, a web server program 613, a web application program 614, etc.) that are executed by the control section 630. The control section 630 includes a processor, and executes the web server program 613, the web application program 614, etc. that are stored in the storage section 610. The function of the control section 630 is achieved in such a manner that the web server program 613 and the web application program 614 are executed by the control section 630, for example. The web application program 614 corresponds to a specific example of a "nail production program" of the present technology.

Specifically, the control section 630 receives order information 712 (to be described later) and user information 711 (to be described later) through the terminal unit 700 and the communication section 620. The order information 712 is information selected by a user, and includes identification information 712A and decorative design information 712B of a nail tip or a nail sticker, as illustrated in FIG. 12. Upon receiving the order information 712 and the user information 711, the control section 630 corrects the existing shape data 312 corresponding to the inputted order information 712 (the identification information 712A) on the basis of the measurement data 262 of a nail corresponding to the received order information 712 (the user information 711). With such correction, the control section 630 generates shape data 316 of the original nail tip or the original nail sticker. The control section 630 converts the generated shape data 316 into the print data 317, and outputs the print data 317 derived from the conversion to the molding unit 400 through the communication section 620. The print data 317 is data described using a script understandable by the molding unit 400. The communication section 620 carries out communication with the other units (the terminal unit 700, etc.) in the nail production system 1 over the network 100.

Further, upon receiving the order information 712 (the decorative design information 712B), the control section 630 generates correction data 318 of existing decorative design data 315 corresponding to the received order information 712 (the decorative design information 712B) by correcting such existing decorative design data 315. The control section 630 converts the generated correction data 318 into the print data 319, and outputs the print data 319 derived from the conversion to the printing unit 500 through the communication section 620. The print data 319 is data described using a script understandable by the printing unit 500.

(Terminal Unit 700)

FIG. 13 illustrates a schematic configuration example of the terminal unit 700. The terminal unit 700 is a terminal unit that a user uses to place an order for a nail tip or a nail sticker, and has, for example, a storage section 710, a communication section 720, a receiving section 730, and a control section 740. The receiving section 730 includes a keyboard, a touch panel, etc. The storage section 710 stores programs (for example, a web browser program 710, an operating system, etc.) that are executed by the control section 740. The user information 711 and the order information 712 are stored in the storage section 710.

The control section 740 includes a processor, and executes a web browser program 713, an operating system, etc. that are stored in the storage section 710. The communication section 720 carries out communication with the other units (the web server unit 600, etc.) in the nail production system 1 over the network 100. A user interface (the receiving section 730) in the terminal unit 700 is achieved in such a manner that an application (for example, html data) that is obtained from the web server unit 600 is processed by the web browser program 713, for example.

The control section 740 (the receiving section 730) receives the order information 712 including the identification information 712A and the decorative design information 712B of a nail tip or a nail sticker, and the user information 711. Upon receiving the order information 712, the control section 740 (the receiving section 730) presents (displays) identification information 611 and decorative design information 612 to a user, and prompts the user to select specific identification information (the identification information 712A) from within the identification information 610, as well as to select specific decorative design information (the decorative design information 712B) from within the decorative design information 612. The identification information 611 is equivalent to the identification information 311 that is associated with the existing shape data 312. The decorative design information 612 is equivalent to the decorative design information 313 that is associated with the existing decorative design data 314. The control section 740 (the receiving section 730) transmits the received order information 712 and the user information 711 to the web server unit 600 through the communication section 720.

[Operation]

Next, the description is provided on an example of procedures of producing a nail tip or a nail sticker in the nail production system 1. FIG. 14 represents an example of procedures of generating print data in the nail production system 1.

At first, a user registers the user information 261, the measurement data 262 of a nail, and the measurement data 263 of a skin onto the registration unit 200 in advance. Next, the user places an order for the nail tip or the nail sticker using the terminal unit 700. Specifically, at the beginning, the user starts the receiving section 730 in the terminal unit 700. Thereafter, the terminal unit 700 (the receiving section 730) prompts the user to input the user information 711. When the user inputs the user information 711 to the terminal unit 700 (the receiving section 730), the terminal unit 700 (the receiving section 730) receives the user information 711 from the user (step S101).

Next, the terminal unit 700 (the receiving section 730) presents (displays) the identification information 611 and the decorative design information 612 to the user (step S102). At this time, the terminal unit 700 (the receiving section 730) prompts the user to select specific identification information (the identification information 712A) from within the identification information 610, as well as to select specific decorative design information (the decorative design information 712B) from within the decorative design information 612. When the user inputs the order information 712 including the identification information 712A and the decorative design information 712B of the nail tip or the nail sticker, the terminal unit 700 (the receiving section 730) receives the order information 712 from the user (step S103). Thereafter, the terminal unit 700 (the receiving section 730) transmits the received order information 712 and the user information 711 to the web server unit 600 through the communication section 720 (step S104).

Thereafter, the web server unit 600 (the control section 630) receives the order information 712 and the user information 711 through the communication section 620 (step S105). Next, the web server unit 600 (the control section 630) corrects the existing shape data 312 corresponding to the received order information 712 (the identification information 712A) on the basis of the measurement data 262 of the nail corresponding to the received order information 712 (the order information 711). With such correction, the web server unit 600 (the control section 630) generates the shape data 316 of an original nail tip or an original nail sticker (step S106). Further, the web server unit 600 (the control section 630) generates the correction data 318 of the existing decorative design data 315 corresponding to the received order information 712 (the decorative design information 712B) by correcting such decorative design data 315 (step S106).

Next, the web server unit 600 (the control section 630) converts the generated shape data 316 into the print data 317 (step S107), and outputs the print data 317 derived from the conversion to the molding unit 400 through the communication section 620 (step S108). Further, the web server unit 600 (the control section 630) converts the generated correction data 318 into the print data 319 (step S107), and outputs the print data 319 derived from the conversion to the printing unit 500 through the communication section 620 (step S108).

Thereafter, the molding unit 400 produces the original nail tip (for example, the nail tip 102 as illustrated in FIG. 5) by discharging resin on the basis of the inputted print data 317. Next, the printing unit 500 prints the decorative design 105 on a surface of the original nail tip (the nail tip 102), for example, as illustrated in FIG. 9 by discharging resin or ink on the basis of the inputted print data 319.

Alternatively, the printing unit 500 prints the decorative design 105 on a surface of the resin sticker 103, for example, as illustrated in FIG. 10 on the basis of the print data 319. Next, the molding unit 400 produces the original nail sticker (the nail sticker 104), for example, as illustrated in FIG. 15 by cutting or half-cutting the resin sticker 103 with the decorative design arranged thereon, for example, as illustrated in FIG. 10 on the basis of the inputted print data 317. In such a method, the nail tip or the nail sticker is produced.

Effects

Next, the description is provided on effects of the nail production system 1.

In recent years, the number of people has been increasing who attach nail tips or nail stickers with designs arranged thereon on their own nails to enjoy dressing up. Typically, a user selects the nail tips or the nail stickers with shapes or sizes meeting user's own nails or preference from among ready-made products. However, the shapes and sizes of the user's own nails are different for every user, and therefore ready-made nail tips or nail stickers do not fit the user's own nails, which has caused an issue of awful looking or easy peel-off. In contrast, it is considered to produce the nail tips using a mold manufactured on the basis of CAD data on the user's own nails that is obtained by measurement. In such a case, however, it is necessary to manufacture the mold for each user, resulting in an increase in manufacturing costs.

Meanwhile, in the nail production system 1, the shape data 316 of the original nail tip or the original nail sticker is generated from the shape data of the existing nail tip or the existing nail sticker (the existing shape data 312) on the basis of the measurement data 261 of a nail. Further, the generated shape data 316 is converted into the print data 317. This makes it possible to obtain the original nail tip (the nail tip 102) or the original nail sticker (the nail sticker 104) that fits a shape or size of user's own nail with use of a printer (the molding unit 400) without using a mold. As a result, this allows for producing the nail tips or the nail stickers that are easy to fit the user's own nails at low cost.

Further, in the nail production system 1, the correction data 318 of the existing decorative design data 314 is generated by correcting the existing decorative design data 314 on the basis of the measurement data 261 of a nail. Further, the generated correction data 318 is converted into the print data 319. This makes it possible to obtain the decorative design that fits shapes or sizes of the user's own nails with use of a printer (the printing unit 500) without using a mold. As a result, this allows for producing the original nail tip (the nail tip 102) or the original nail sticker (the nail sticker 104) on which the decorative design is arranged in an attractive manner.

Additionally, in the nail production system 1, it is possible to produce the original nail tip (the nail tip 102) by discharging resin on the basis of the print data 317. Thus, this makes it possible to obtain the original nail tip (the nail tip 102) that fits a shape or size of the user's own nail with use of a printer (the molding unit 400) without using a mold. As a result, this allows for producing the original nail tip (the nail tip 102) that is easy to fit the user's own nail at low cost.

Moreover, in the nail production system 1, it is possible to produce the original nail sticker (the nail tip 102) by cutting or half-cutting a resin sticker on the basis of the print data 317. Thus, this makes it possible to obtain the original nail sticker (the nail tip 102) that fits a shape or size of the user's own nail with use of a printer (the molding unit 400) without using a mold. As a result, this allows for producing the original nail sticker (the nail tip 102) that is easy to fit the user's own nail at low cost.

Further, in the nail production system 1, it is possible to print the decorative design 105 on a surface of the original nail tip (the nail tip 102) by discharging resin or ink on the basis of the print data 319. As a result, this allows for producing the original nail tip (the nail tip 102) on which the decorative design is arranged in an attractive manner.

Additionally, in the nail production system 1, it is possible to print the decorative design 105 on a surface of the resin sticker 103 by discharging resin or ink on the basis of the print data 319. As a result, this allows for producing the original nail sticker (the nail tip 102) on which the decorative design is arranged in an attractive manner.

2. Modification Examples

Modification Example A

Next, the description is provided on a modification example of procedures of producing the nail tip or the nail sticker in the nail production system 1. FIG. 16 represents an example of procedures of generating print data in the nail production system 1.

The terminal unit 700 (the receiving section 730) receives the user information 711 from a user (step S101), and thereafter transmits the received user information 711 to the web server unit 600 through the communication section 720 (step S109).

Thereafter, the web server unit 600 (the control section 630) receives the user information 711 through the communication section 620 (step S110). Next, the web server unit 600 (the control section 630) selects one or a plurality of recommended decorative designs from within the decorative design information 612 on the basis of the measurement data 263 of a skin corresponding to the received user information 711. The web server unit 600 (the control section 630) transmits the selected one or plurality of recommended decorative designs to the terminal unit 700 through the communication section 620 (step S111).

Thereafter, the terminal unit 700 (the receiving section 730) receives the one or the plurality of recommended decorative designs through the communication section 720 (step S112). Next, the terminal unit 700 (the receiving section 730) presents (displays) the received one or plurality of recommended decorative designs to a user along with the identification information 611 and the decorative design information 612 (step S113). The user inputs the order information 712 including the identification information 712A and the decorative design information 712B of the nail tip or the nail sticker while referring to the one or the plurality of recommended decorative designs. Thereafter, the terminal unit 700 (the receiving section 730) receives the order information 712 from the user (step S103). The subsequent flow is similar to that in the above-described embodiment.

In the present modification example, the one or the plurality of recommended decorative designs are selected on the basis of the measurement data 263 of the skin, and information corresponding to the selected one or the plurality of recommended decorative designs is outputted (displayed). This makes it possible to produce the original nail tip (the nail tip 102) or the original nail sticker (the nail tip 102) on which well-suited decorative design is arranged.

Modification Example B

In the above-described embodiment and modification example thereof, the order information 712 includes the identification information 712A and the decorative design information 712B; however, the decorative design information 712B may be omitted as illustrated in FIG. 17A, for example. Even in such a case, it is possible to produce the nail tip or the nail sticker that is easy to fit the user's own nail at low cost, as with the above-described embodiment.

Modification Example C

In the above-described embodiment and modification example thereof, the order information 712 includes the identification information 712A and the decorative design information 712B. However, for example, as illustrated in FIG. 17B, the order information 712 may further include correction information 712C in addition to the identification information 712A and the decorative design information 712B. The correction information 712C is, for example, information obtained in such a manner that the decorative design information 712B selected by a user is displayed on the terminal unit 700 (the receiving section 730) with the decorative design information 712B overlaid on a thumbnail included in the identification information 712A selected by the user, and the user is made to adjust a position, a direction, a size, etc. of the decorative design information 712B relative to the thumbnail in the above-described state.

As described above, by including the correction information 712C in the order information 712, the web server unit 600 (the control section 630) makes it possible to correct the existing decorative design data 315 corresponding to the received order information 712 (the decorative design information 712B) with use of the received order information 712 (the order information 712). As a result, the web server unit 600 (the control section 630) allows for generating the correction data 318 that meets the user preference.

The present technology is described thus far with reference to the plurality of embodiments and modification examples thereof; however, the present technology is not limited to the above-described embodiment, etc., but various modifications may be made. It is to be noted that the effects mentioned herein are merely exemplified. The effects of the present technology are not limited to the effects described herein. The present technology may have any effects other than those described herein.

Further, for example, the present technology may be configured as follows.

(1)

A nail production system including:

a first correction section that corrects shape data of an existing nail tip or an existing nail sticker on the basis of measurement data of a nail, to thereby generate shape data of an original nail tip or an original nail sticker; and a first conversion section that converts the shape data of the original nail tip or the original nail sticker that is generated by the first correction section into print data.

(2)

The nail production system according to (1), further including:

a second correction section that corrects data of a decorative design to be printed on a surface of the original nail tip or the original nail sticker on the basis of the measurement data of the nail, to thereby generate correction data of the decorative design; and a second generation section that converts the correction data of the decorative design that is generated by the second correction section into print data.

(3)

The nail production system according to (1) or (2), further including a first production section that produces the original nail tip by discharging resin on the basis of the print data derived from the first conversion section.

(4)

The nail production system according to (1) or (2), further including a first production section that produces the original nail sticker by cutting or half-cutting a resin sticker on the basis of the print data derived from the first conversion section.

(5)

The nail production system according to (2), further including a second production section that prints the decorative design on a surface of the original nail tip by discharging resin or ink on the basis of the print data derived from the second conversion section.

(6)

The nail production system according to (2), further including a second production section that prints the decorative design on a surface of a resin sticker by discharging resin or ink on the basis of the print data derived from the second conversion section.

(7)

The nail production system according to (2), further including an output section that selects one or a plurality of recommended decorative designs on the basis of measurement data of a skin to output information corresponding to the one or the plurality of recommended decorative designs that are selected.

(8)

A nail production method, the method including:

correcting shape data of an existing nail tip or an existing nail sticker on the basis of measurement data of a nail, to thereby generate shape data of an original nail tip or an original nail sticker; and converting the shape data of the original nail tip or the original nail sticker that is generated by the first correction section into print data.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A nail production system comprising:

a first correction section that corrects shape data of an existing nail tip or an existing nail sticker on a basis of measurement data of a nail, to thereby generate shape data of an original nail tip or an original nail sticker;

a first conversion section that converts the shape data of the original nail tip or the original nail sticker that is generated by the first correction section into print data;

a second correction section that corrects data of a decorative design to be printed on a surface of the original nail tip or the original nail sticker on a basis of the measurement data of the nail, to thereby generate correction data of the decorative design;

a second generation section that converts the correction data of the decorative design that is generated by the second correction section into print data; and an output section that selects one or a plurality of recommended decorative designs on a basis of measurement data of a skin to output information corresponding to the one or the plurality of recommended decorative designs that are selected.

2. The nail production system according to claim 1, further comprising a first production section that produces the original nail tip by discharging resin on a basis of the print data derived from the first conversion section.

3. The nail production system according to claim 1, further comprising a first production section that produces the original nail sticker by cutting or half-cutting a resin sticker on a basis of the print data derived from the first conversion section.

4. The nail production system according to claim 1, further comprising a second production section that prints the decorative design on a surface of the original nail tip by discharging resin or ink on a basis of the print data derived from the second conversion section.

5. The nail production system according to claim 1, further comprising a second production section that prints the decorative design on a surface of a resin sticker by discharging resin or ink on a basis of the print data derived from the second conversion section.

6. A nail production method, the method comprising:

correcting shape data of an existing nail tip or an existing nail sticker on a basis of measurement data of a nail, to thereby generate shape data of an original nail tip or an original nail sticker;

converting the shape data of the original nail tip or the original nail sticker that is generated by a first correction section into print data;

correcting data of a decorative design to be printed on a surface of the original nail tip or the original nail sticker on a basis of the measurement data of the nail, to thereby generate correction data of the decorative design;

converting the correction data of the decorative design that is generated by a second correction section into print data; and selecting one or a plurality of recommended decorative designs on a basis of measurement data of a skin to output information corresponding to the one or the plurality of recommended decorative designs that are selected.

\* \* \* \* \*